US007268801B2

(12) United States Patent
Hirunuma et al.

(10) Patent No.: US 7,268,801 B2
(45) Date of Patent: Sep. 11, 2007

(54) DIGITAL-CAMERA-PROVIDED BINOCULARS

(75) Inventors: Ken Hirunuma, Tokyo (JP); Atsumi Kaneko, Tokyo (JP)

(73) Assignee: PENTAX Corporation, Tokyo (JP)

( * ) Notice: Subject to any disclaimer, the term of this patent is extended or adjusted under 35 U.S.C. 154(b) by 460 days.

(21) Appl. No.: 10/700,496

(22) Filed: Nov. 5, 2003

(65) Prior Publication Data
US 2004/0095643 A1    May 20, 2004

(30) Foreign Application Priority Data
Nov. 14, 2002    (JP)    ............... P2002-330729

(51) Int. Cl.
*H04N 9/04*    (2006.01)
*H04N 5/225*    (2006.01)
(52) U.S. Cl. .......... 348/207.99; 359/407; 396/312
(58) Field of Classification Search ............ 359/407, 359/363; 396/324–331, 310, 312; 348/207.99
See application file for complete search history.

(56) References Cited
U.S. PATENT DOCUMENTS

| 4,067,027 | A | 1/1978 | Yamazaki |
| 4,262,988 | A | 4/1981 | Ishibai et al. |
| 4,400,065 | A | 8/1983 | Nagler |
| 4,687,707 | A | 8/1987 | Matsuo et al. |
| 5,583,692 | A | 12/1996 | Funatsu |
| 5,622,784 | A | 4/1997 | Okaue et al. |
| 5,729,390 | A | 3/1998 | Abe |
| 5,733,660 | A | 3/1998 | Makita et al. |
| 5,783,299 | A | 7/1998 | Miyashita et al. |
| 5,926,657 | A | 7/1999 | Hasushita |
| 6,088,053 | A | 7/2000 | Hammack et al. |
| 6,401,069 | B1 | 6/2002 | Boys et al. |
| 2001/0028498 | A1 | 10/2001 | Haga et al. |
| 2002/0069070 | A1* | 6/2002 | Boys et al. .................. 704/275 |
| 2003/0063189 | A1* | 4/2003 | Hirunuma et al. ............ 348/79 |
| 2003/0063209 | A1 | 4/2003 | Enomoto et al. |
| 2003/0063380 | A1 | 4/2003 | Hirunuma et al. |
| 2003/0063381 | A1 | 4/2003 | Abe |
| 2003/0063382 | A1 | 4/2003 | Hirunuma et al. |
| 2003/0072091 | A1 | 4/2003 | Abe |
| 2003/0072567 | A1 | 4/2003 | Abe |
| 2003/0086164 | A1 | 5/2003 | Abe |
| 2003/0151660 | A1 | 8/2003 | Hirunuma et al. |
| 2003/0151807 | A1 | 8/2003 | Hirunuma et al. |
| 2003/0151808 | A1 | 8/2003 | Hirunuma et al. |

(Continued)

FOREIGN PATENT DOCUMENTS
GB        2386492        9/2003

(Continued)

OTHER PUBLICATIONS
English Language Abstract of JP11-308568.

(Continued)

*Primary Examiner*—Joshua L Pritchett
(74) *Attorney, Agent, or Firm*—Greenblum & Bernstein, P.L.C.

(57) ABSTRACT

Binoculars having a digital camera are provided. The digital camera is able to capture an image of an object which is observed through the optical systems of the binoculars. The digital-camera-provide binoculars further comprise a microphone. The microphone is provided on the bottom face of the binoculars.

6 Claims, 6 Drawing Sheets

U.S. PATENT DOCUMENTS

2003/0202118 A1 10/2003 Hurunuma et al.
2005/0018048 A1* 1/2005 Wu et al. .............. 348/207.99

FOREIGN PATENT DOCUMENTS

| JP | 36-12387 | 8/1961 |
| JP | 57-79909 | 5/1982 |
| JP | 62-96919 | 5/1987 |
| JP | 5-2132 | 1/1993 |
| JP | 6-2330 | 1/1994 |
| JP | 6-340966 | 12/1994 |
| JP | 7-8848 | 2/1995 |
| JP | 7-283978 | 10/1995 |
| JP | 08-098209 | * 12/1996 |
| JP | 2624556 | 4/1997 |
| JP | 11-248996 | 9/1999 |
| JP | 11-308568 | 11/1999 |
| JP | 2001-281555 | 10/2001 |
| JP | 2001-311868 | 11/2001 |
| WO | 01/52531 | 7/2001 |
| WO | 03/014798 | 2/2003 |
| WO | 03/042851 | 5/2003 |

OTHER PUBLICATIONS

English Language Abstract of JP6-340966.
English Language Abstract of JP 11-248996.
English Language Abstract of JP 2001-311868.

* cited by examiner

DIGITAL-CAMERA-PROVIDED BINOCULARS

BACKGROUND OF THE INVENTION

1. Field of the Invention

The present invention relates to binoculars provided with a digital camera.

2. Description of the Related Art

Conventionally, digital-camera-provided binoculars into which the functions of a digital camera and binoculars are integrated, are known. For the digital-camera-provided binoculars, an image similar to that observed trough a pair of ocular lens systems can be displayed on an LCD monitor and stored in a recording medium as a digital image.

On the other hand, some digital cameras are provided with a microphone for recording sound for a digital image captured by and stored in the camera. Recording may be carried out immediately after capturing the image, before a predetermined time has elapsed, or some time after the image capturing operation, by selecting an image and post recording. The immediate recording may be carried out to produce a feeling of presence at the location where the image was captured, by recording the surrounding sound, or to record voice that describes the situation, as a memorandum. Further, the post recording may be carried out by indicating an image on the display monitor and recording certain suitable sound data. However, a conventional digital camera is a device for capturing images, so that voice or sound recording operations while looking into a viewfinder is not presumed. Therefore, the microphone of the conventional digital camera is disposed on the front side (lens provided side) of the camera body, beside the finder, or on the top surface of the camera body, which is not suitable for recording the voice of a user when the user is looking into the viewfinder.

On the other hand, telescopic observation through the binoculars is the main use for the digital-camera-provided binoculars, so that an image capturing operation is generally carried out while observing objects through the binoculars.

SUMMARY OF THE INVENTION

Therefore, an object of the present invention is to provide a digital-camera-provided binoculars that can easily perform fine voice recording while carrying out telescopic binocular observations.

According to the present invention, digital-camera-provided binoculars are provided that comprise a digital camera and a microphone. The digital camera is able to capture an image of an object which is observed through the optical systems of the binoculars. The microphone is provided on the bottom face of the binoculars.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
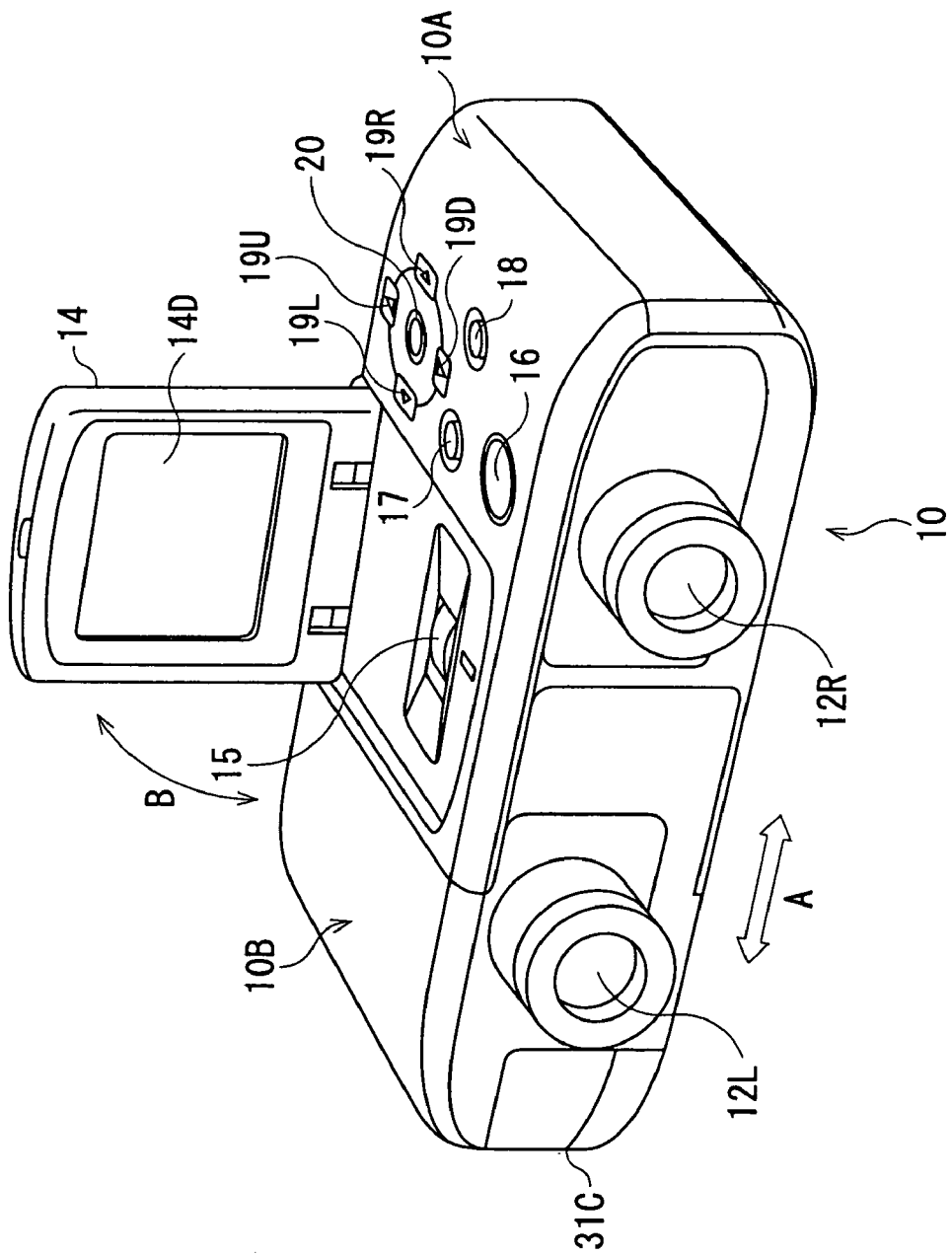
FIG. 1 is a perspective view of a digital-camera-provided binoculars of the present embodiment, which shows the entire appearance of the binoculars from the backside.

The present invention is described below with reference to the embodiment shown in the drawings.

Figure 2:
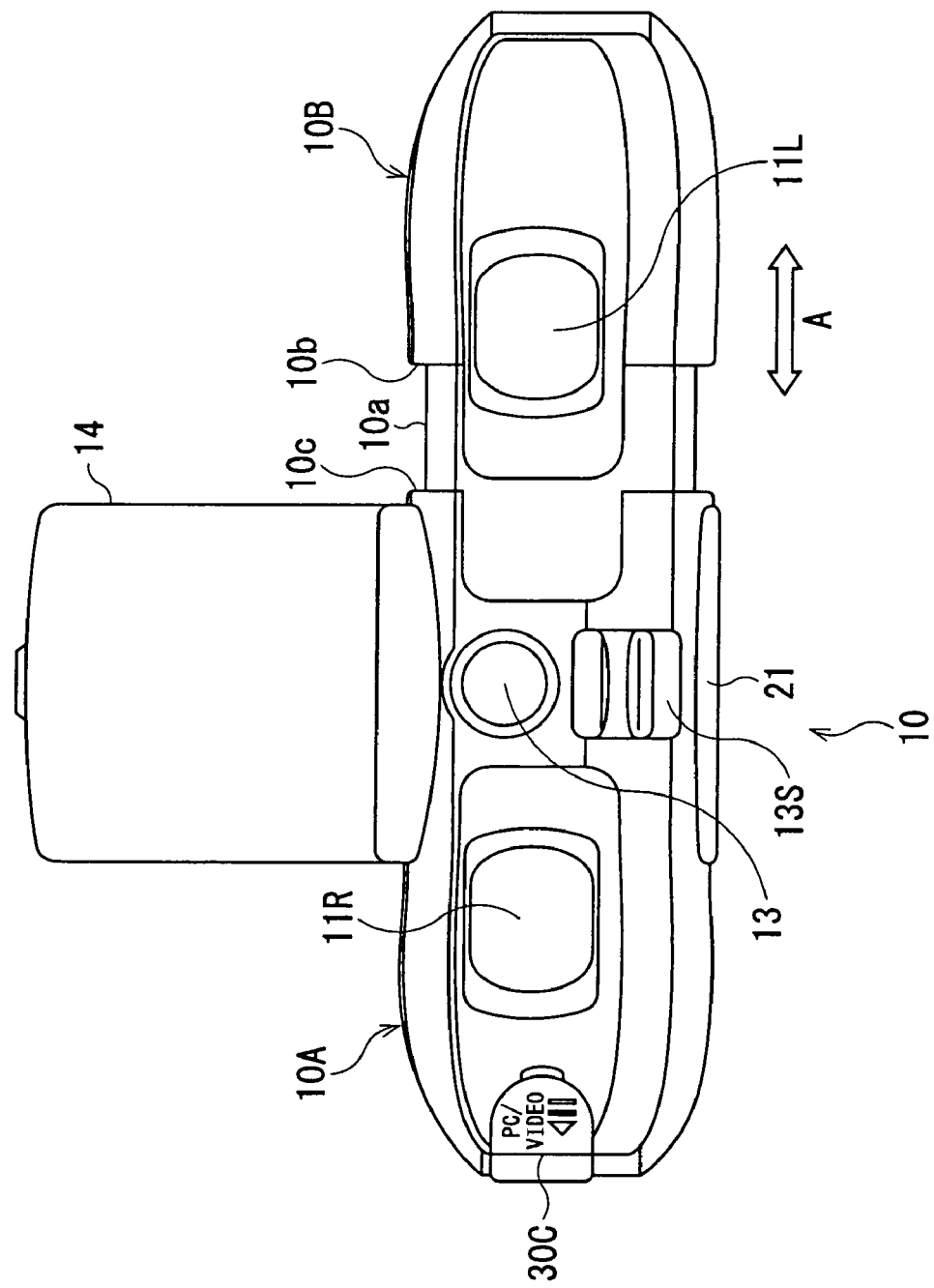
FIG. 2 is a front view of the digital-camera-provided binoculars shown in FIG. 1.
Figure 3:
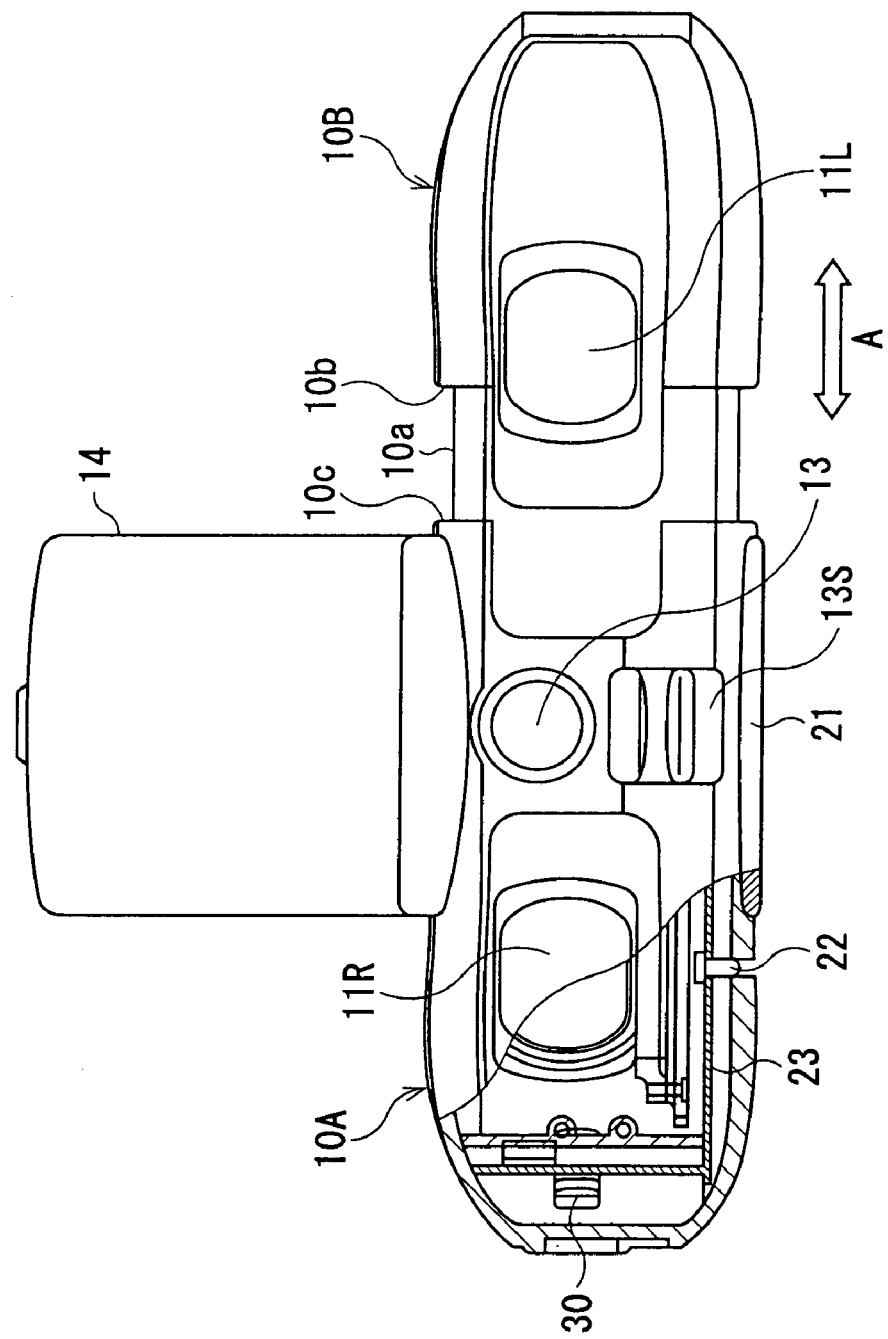
FIG. 3 is a fragmental front view of the digital-camera-provided binoculars.
Figure 4:
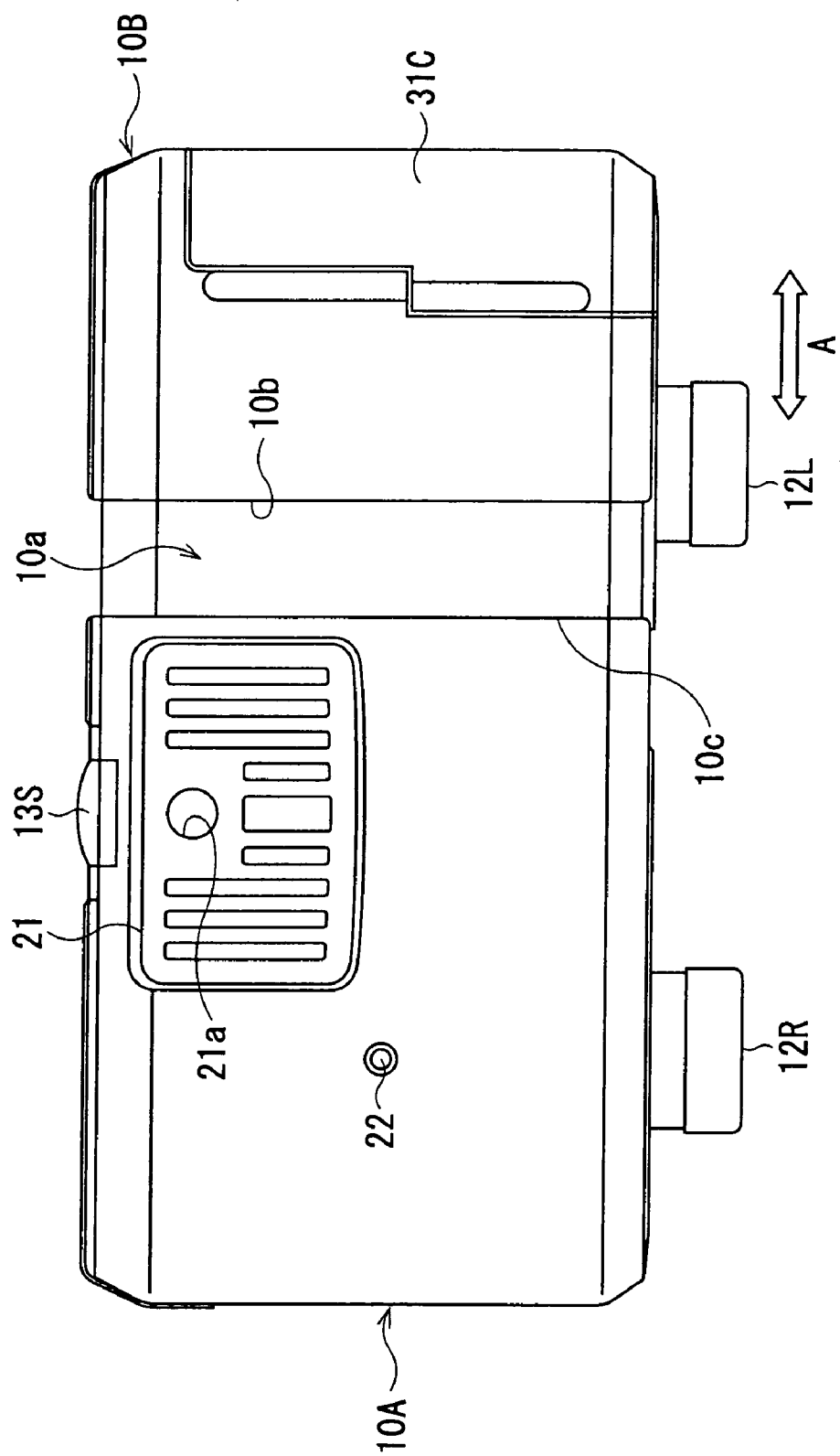
FIG. 4 is a bottom view of the digital-camera-provided binoculars.

FIG. 1 is a perspective view of the binoculars provided with a digital camera of the present embodiment, which shows the entire appearance of the binoculars from the backside. The backside being the ocular lens side. FIG. 2 is a front view (viewed from the objective lens side) of the digital-camera-provided binoculars shown in FIG. 1. FIG. 3 is a fragmental front view of the digital-camera-provided binoculars. Further, FIG. 4 is a bottom view of the digital-camera-provided binoculars. Herein, the digital-camera-provided binoculars of the present embodiment will be described with reference to FIG. 1 through FIG. 4.

The digital-camera-provided binoculars 10 are comprised of a main body 10A and a movable body 10B. The movable body 10B is a component that can be slidably moved in a lateral direction (as shown by an arrow 'A') relative to the main body 10A for adjusting interpupillary distance of the binoculars. FIG. 1 shows the retracted position of the binoculars, in which interpupillary distance is made minimum. FIGS. 2, 3, and 4 are depicted at a position which the interpupillary distance is set at a certain width greater than the width at the retracted position. As shown in FIGS. 2 through 4, a casing of the main body 10A comprises an insertion section 10a that can be slidably fitted into an opening 10b of a casing of the movable body 10B. Since the insertion section is inserted inside the movable body 10B, the dimensions of the insertion section 10a are slightly smaller than the dimensions of the main section of the main body 10A, so that the insertion section 10a and the main section of the main body 10A are connected at the boundary which appears as a step 10c. When the binoculars are not used, the main body 10A and the movable body 10B are kept in the retracted position in which the interpupillary distance is minimized (the position depicted in FIG. 1), so that all of the insertion section 10a is fitted inside the movable body 10B and the edge of the opening 10b formed on the movable body 10B contacts with the step 10c of the main body 10A.

Note that, when the binoculars are being used, the main body 10A is held between the thumb bearing upon the bottom face and the other fingers bearing upon the top face. The top and bottom sides of the binoculars 10 are defined with the pair of optical axes of the binoculars 10 being held coplanar with a horizontal plane. Namely, the top and bottom or the upper and lower directions correspond to the directions perpendicular to the arrow directions 'A', in FIG. 2.

The main body 10A is provided with a telescopic observation optical system for a right eye and a photographing optical system for the digital camera. Namely, on the front face of the main body 10A, an objective lens 11R for the right lens system and an objective lens 12 for the digital camera are provided, and on the rear face, an ocular lens 12R (see FIG. 3) associated with the objective lens 11R, is provided. On the other hand, on the front face of the movable body 10B, an objective lens 11L for the left lens system is provided, and on the rear face, an ocular lens 12L associated with the objective lens 11L is provided. Note that, the objective lens 13 for the digital camera is disposed between the objective lenses 11L and 11R, and the objective lens 13 is covered with a lens barrier when the digital camera is not in use. Open and close operations of the lens barrier are carried out by using a slide lever provided on the front face of the main body 10A.

On the top face of the casing of the main body 10A, an image-indicating device 14 with a screen 14D (see FIG. 1), including an LCD, is provided. A focusing drive 15 is located on the top face of the casing, closer to the rear side than the image-indicating device 14 and is associated with the optical systems of the binoculars and the digital camera for adjusting focus of each optical system. The image-indicating device 14 is formed as a folding type panel and is rotatably fixed to an axis parallel to the ridgeline formed by the top face and the front face (refer to arrow 'B' in FIG. 1). Namely, when the image-indicating device 14 is opened, the image-indicating device 14 is substantially erected with its screen (LCD 14D) facing the rear side (the ocular lens side). Further, when the image-indicating device is closed or folded, the image-indicating device 14 is laid down upon the top face of the casing, whereby the screen 14D faces the top face. Note that, captured images or live movie from the digital camera can be displayed on the screen 14D.

As shown in FIG. 1, a release switch 16 is provided on the right side of the main body 10A. On the top face of the main body 10A and in front of the release switch 16 (closer to the front side than the release switch 16), a menu key 17, a recording key 18, four cursor keys 19U, 19D, 19L, and 19R, which correspond to respective up, down, left, and right directions, and an OK key 20 surrounded by the for cursor keys are provided. Namely, when a user holds the main body 10A with his or her right hand to use the digital-camera-provided binoculars 10, the forefinger of the right hand is positioned at an area where the forefinger can operate the switches 16 to 20, so that the user can depress the release switch 16 with the forefinger while viewing through the binoculars.

On the other hand, as shown in FIG. 4, a tripod attaching section 21 and a microphone 22 are provided on the bottom face of the main body 10A. Further, on the tripod attaching section 21, a tripod screw hole 21a, is formed. Namely, the binoculars 10 can be fixed to a tripod head (not shown) through the tripod attaching section 21. Note that, the main body 10A is provided with a USB/video output terminal 30 at the side end thereof, and the USB/video output terminal, in general, is covered with a terminal cover 30C. Furthermore, a battery chamber 31 (see FIG. 5) is provided on the side of the movable body 10B and covered with a battery cover 31C (see FIGS. 1 and 4).

The microphone 22 is mounted on a circuit board 23 that is arranged inside the casing of the main body, parallel with the bottom face of the casing. On the bottom wall of the casing for the main body 10A, a hole having substantially the same dimension as the diameter of the microphone, which connects the inside and outside of the casing, is formed at a position corresponding to the position where the microphone 22 is mounted. Namely, the microphone corrects sound through the hole provided on the bottom face of the main body 10A. In the present embodiment, the microphone 22 is disposed under the optical system of the right lens system (between the objective lens 11R and the ocular lens 12R), and substantially at the center in the back and forth direction.

By using digital-camera-provided binoculars 10 of the present embodiment, an image substantially equal to an image observed through the objective lens systems 11L and 11R of the binoculars can be captured through the objective lens 13 of the photographing optical system. Namely, an imaging device, not shown, is mounted inside the main body 10A, so that when the release switch 16 is fully depressed, an image produced through the objective lens 13 can be captured by the imaging device as a digital image by using an electronic shutter operation or the like. Further, when the recording key 18 is depressed within a predetermined time after an image capturing operation, the sound surrounding the binoculars is recorded as sound data through the microphone 22 for a predetermined time and stored in a memory as sound data corresponding to the captured digital image.

As described above, according to the present embodiment, since the microphone 10 is provided on the bottom face of the binoculars 10, sound information including the voice of a user, which relates to situations when capturing an object image, can be easily and clearly recorded even when the telescopic observation is being carried out.

Figure 5:
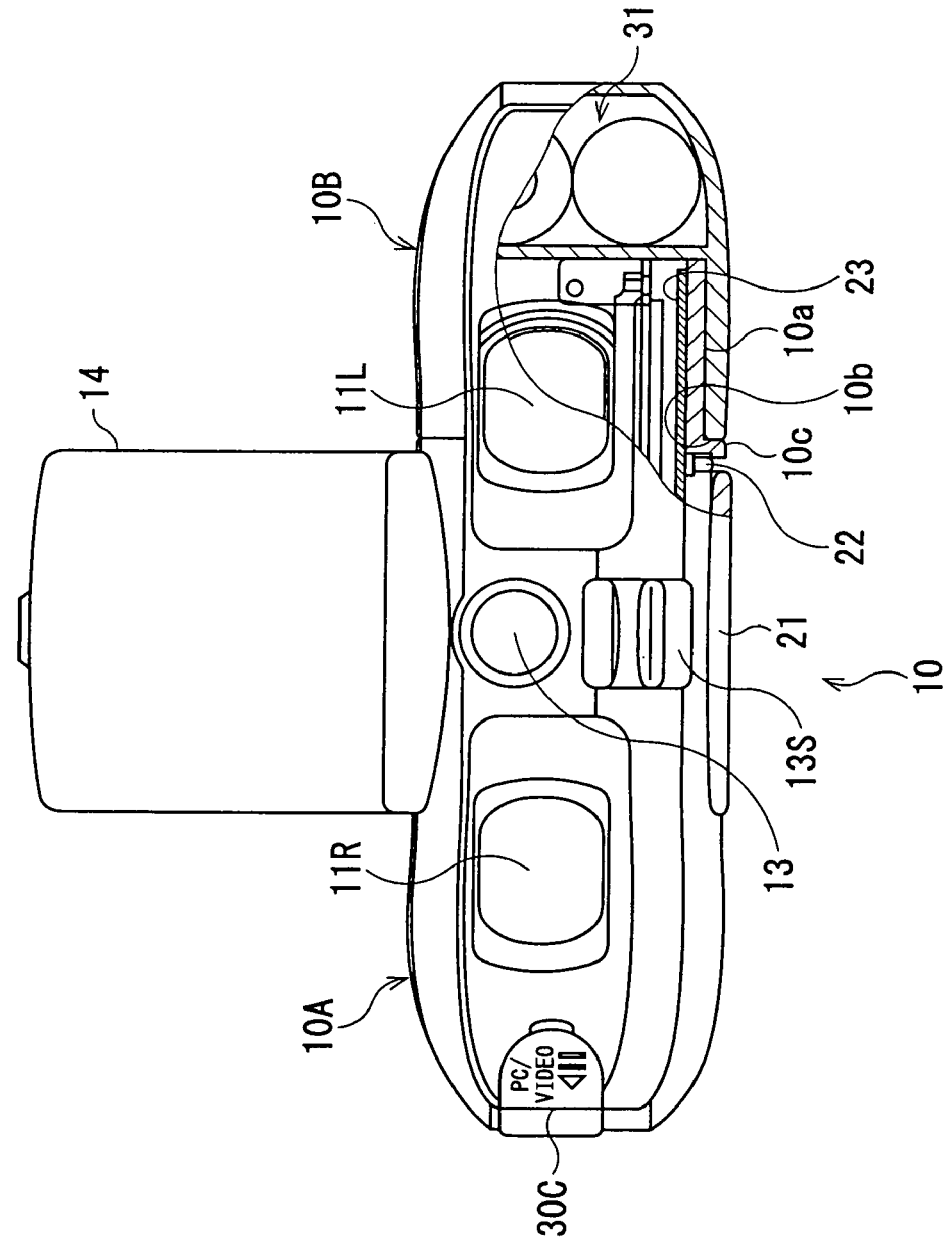
FIG. 5 is a fragmental front view of the digital-camera-provided binoculars of the alternate embodiment.
Figure 6:
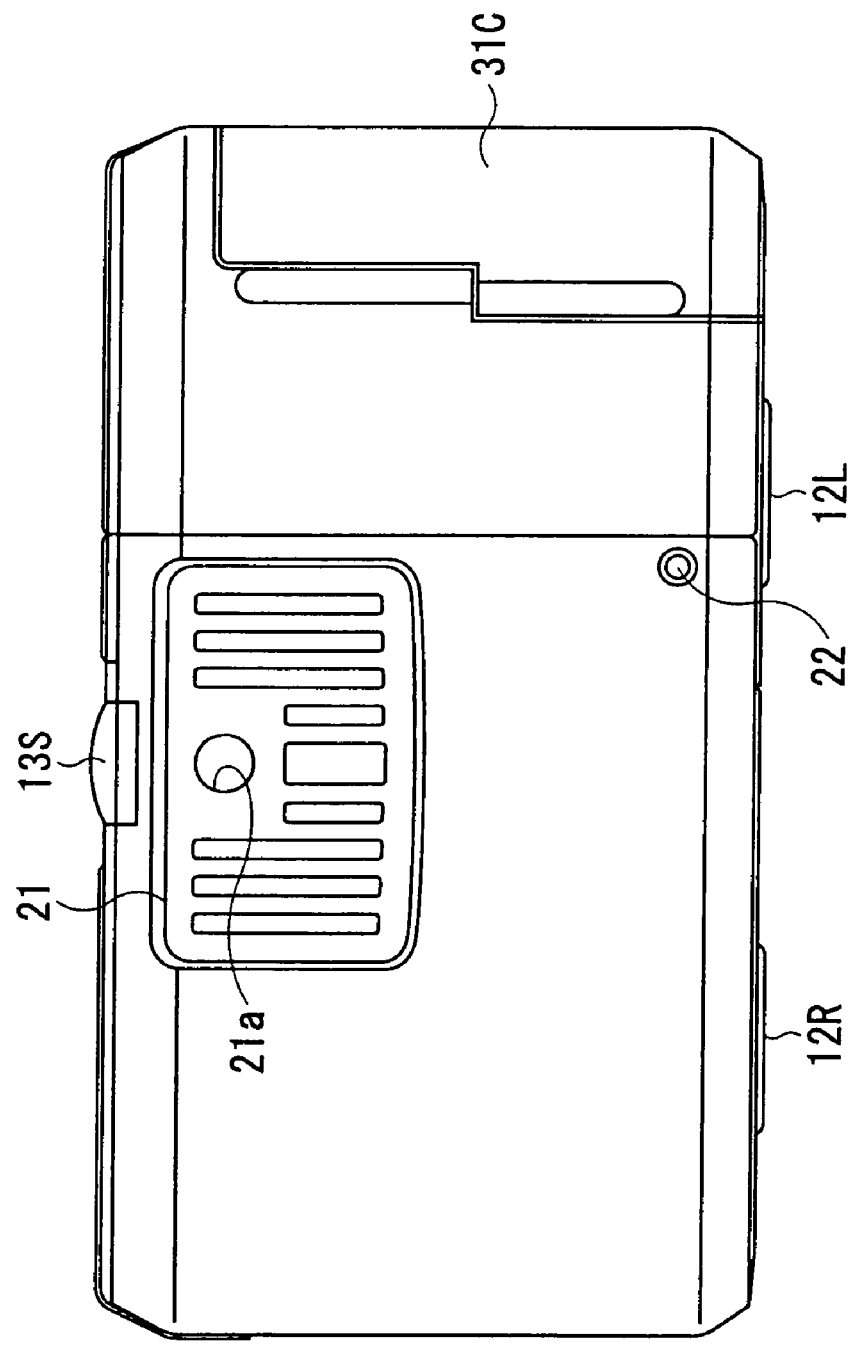
FIG. 6 is a bottom view of the alternate embodiment shown in FIG. 5.

With reference to FIG. 5 and FIG. 6, an alternative to the present embodiment will be explained. In the alternative embodiment, the position of the microphone on the bottom face is the only structure that is dissimilar to the former embodiment, so that descriptions will be made only for a position relating to the microphone. Note that, the binoculars 10 shown in FIGS. 5 and 6 are at the retracted position in which the interpupillary distance is minimum. Further, in FIG. 6, the most of the ocular lenses 12R and 12L are retracted inside the casing, by rotating the focusing drive.

FIG. 5 is a fragmental front view of the digital-camera-provided binoculars of the alternative embodiment, and FIG. 6 is a bottom view thereof. In the alternate embodiment, the microphone 22 is disposed on the bottom face of the main body 10A in the vicinity of the rear face to which the ocular lenses 12R and 12L are provided, and further, at a position close to the step 10c. Namely, the microphone 22 is arranged at the position which is close to the ocular lens side and between the ocular lenses 12L and 12R.

As described above, according to the alternate embodiment, the same effect as that in the former embodiment can be achieved. Further, in the alternate embodiment, the microphone is located much closer to the mouth of a user when the telescopic binoculars observation is carried out, so that voice of the user can be collected more clearly compared to the former embodiment.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2002-330729 (filed on Nov. 14, 2002) which is expressly incorporated herein, by reference, in its entirety.

The invention claimed is:

1. Digital-camera-provided binoculars, comprising:
   a digital camera that is able to capture an image of an object which is observed through optical systems of said binoculars; and
   a microphone;
   wherein said microphone is provided on a bottom face of said binoculars, and
   wherein said digital camera and said microphone are mounted on different surfaces of said binoculars.

2. Binoculars according to claim 1, wherein said bottom face comprises a tripod attaching section to which a tripod is attached.

3. Binoculars according to claim 1, wherein sound information collected by said microphone is recorded in association with an image captured by said digital camera.

4. Binoculars according to claim 1, wherein recording using said microphone is carried out just after an image capturing operation of said digital camera.

5. Binoculars according to claim 1, wherein said microphone is positioned on said bottom face and in the vicinity of a rear face where ocular lenses of said binoculars are provided.

6. Binoculars according to claim 1, wherein said microphone is positioned on said bottom face and between a pair of said optical systems of said binoculars.

* * * * *